(12) United States Patent
Takamatsu et al.

(10) Patent No.: US 7,558,659 B2
(45) Date of Patent: Jul. 7, 2009

(54) POWER TRAIN CONTROL DEVICE IN VEHICLE INTEGRATED CONTROL SYSTEM

(75) Inventors: Hideki Takamatsu, Anjo (JP); Masami Kondo, Toyota (JP); Hiroshi Mizuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 490 days.

(21) Appl. No.: 10/575,446

(22) PCT Filed: Nov. 30, 2004

(86) PCT No.: PCT/JP2004/018225

§ 371 (c)(1),
(2), (4) Date: Apr. 12, 2006

(87) PCT Pub. No.: WO2005/062274

PCT Pub. Date: Jul. 7, 2005

(65) Prior Publication Data

US 2007/0083315 A1    Apr. 12, 2007

(30) Foreign Application Priority Data

Dec. 19, 2003    (JP) .............................. 2003-423569

(51) Int. Cl.
*G06F 17/00* (2006.01)
(52) U.S. Cl. .............................. 701/51; 701/56; 701/90
(58) Field of Classification Search ............ 701/51–61, 701/90; 477/34; 474/69–70
See application file for complete search history.

(56) References Cited

U.S. PATENT DOCUMENTS

| | | | | |
|---|---|---|---|---|
| 4,819,187 A | * | 4/1989 | Yasue et al. ................... | 701/99 |
| 4,945,481 A | * | 7/1990 | Iwatsuki et al. ............... | 701/54 |
| 5,025,380 A | * | 6/1991 | Wataya et al. ............... | 701/103 |
| 5,351,776 A | | 10/1994 | Keller et al. | |
| 6,128,564 A | | 10/2000 | Graf | |
| 6,173,226 B1 | | 1/2001 | Yoshida et al. | |
| 2003/0104899 A1 | | 6/2003 | Keller | |
| 2004/0035618 A1 | | 2/2004 | Grassl et al. | |

FOREIGN PATENT DOCUMENTS

| | | |
|---|---|---|
| DE | 102 42 230 A1 | 10/2003 |
| EP | 0 507 072 A2 | 10/1992 |
| JP | A-05-085228 | 4/1993 |
| JP | A-2000-102107 | 4/2000 |

(Continued)

*Primary Examiner*—Yonel Beaulieu
(74) *Attorney, Agent, or Firm*—Oliff & Berridge, PLC

(57) ABSTRACT

A power train control device includes a requested torque calculation unit that calculates requested torque for an engine based on a parameter input from an upper level computing device, a transmission gear ratio determination unit that determines a transmission gear ratio, a transmission control unit that calculates output shaft torque and gearshift time of an automatic transmission at the time of gearshift and outputs a control parameter to an automatic transmission control device, a generated driving torque calculation unit that calculates driving torque generated in the power train, taking account of the load torque of the engine input from a load torque computing device, and outputs the calculated driving torque to the upper level computing device, and an availability calculation unit that calculates and outputs availability of the driving torque to the upper level computing device.

24 Claims, 6 Drawing Sheets

FOREIGN PATENT DOCUMENTS

| | | |
|---|---|---|
| JP | A-2001-322456 | 11/2001 |
| JP | A-2002-005277 | 1/2002 |
| JP | A-2002-161782 | 6/2002 |
| JP | A-2003-191774 | 7/2003 |
| WO | WO 02/26520 A1 | 4/2002 |

* cited by examiner

US 7,558,659 B2

POWER TRAIN CONTROL DEVICE IN VEHICLE INTEGRATED CONTROL SYSTEM

TECHNICAL FIELD

The present invention relates to a control device for a vehicle, and more particularly to a driving system control device for use in a system controlling in an integrated manner a plurality of actuators in a vehicle.

BACKGROUND ART

There has been an increasing trend in recent years towards incorporating many types of motion control devices in the same vehicle to control the motion of the vehicle. The effect produced by each of the different types of motion control devices may not always emerge in a manner independent of each other at the vehicle. There is a possibility of mutual interference. It is therefore important to sufficiently organize the interaction and coordination between respective motion control devices in developing a vehicle that incorporates a plurality of types of motion control devices.

For example, when it is requested to incorporate a plurality of types of motion control devices in one vehicle in the development stage of a vehicle, it is possible to develop respective motion control devices independently of each other, and then implement the interaction and coordination between respective motion control devices in a supplemental or additional manner.

In the case of developing a plurality of types of motion control devices in the aforesaid manner, organization of the interaction and coordination between respective motion control devices requires much time and effort.

With regards to the scheme of incorporating a plurality of types of motion control devices in a vehicle, there is known the scheme of sharing the same actuator among the motion control devices. This scheme involves the problem of how the contention among the plurality of motion control devices, when requested to operate the same actuator at the same time, is to be resolved.

In the above-described case where the interaction and coordination among a plurality of motion control devices are to be organized in a supplemental or additional manner after the motion control devices are developed independently of each other, it is difficult to solve the problem set forth above proficiently. In practice, the problem may be accommodated only by selecting an appropriate one of the plurality of motion control devices with precedence over the others, and dedicate the actuator to the selected motion control device alone.

Regarding the above-described problem, Japanese Patent Laying-Open No. 5-85228 (Document 1) discloses an electronic control system for a vehicle that can reduce the time requested for development, and that can improve the reliability, usability, and maintenance feasibility of the vehicle. This electronic control system for a vehicle includes elements coacting for carrying out control tasks with reference to engine power, drive power and braking power, and elements for coordinating the coaction of the elements to effect a control of operating performance of the motor vehicle in correspondence to a request of the driver. Respective elements are arranged in the form of a plurality of hierarchical levels. At least one of the coordinating elements of the hierarchical level is adapted for acting on the element of the next hierarchical level when translating the request of the driver into a corresponding operating performance of the motor vehicle, thereby acting on a pre-given subordinate system of the driver-vehicle system while providing the performance requested from the hierarchical level for this subordinate system.

By organizing the entire system in a hierarchy configuration in accordance with this electronic control system for a vehicle, an instruction can be conveyed only in the direction from an upper level to a lower level. The instruction to execute the driver's request is transmitted in this direction. Accordingly, a comprehensible structure of elements independent of each other is achieved. The linkage of individual systems can be reduced to a considerable level. The independency of respective elements allows the individual elements to be developed concurrently at the same time. Therefore, each element can be developed in accordance with a predetermined object. Only a few interfaces with respect to the higher hierarchical level and a small number of interfaces for the lower hierarchical level have to be taken into account. Accordingly, optimization of the totality of the driver and the vehicle electronic control system with respect to energy consumption, environmental compatibility, safety and comfort can be achieved.

Japanese Patent Laying-Open No. 2003-191774 (Document 2) discloses an integrated type vehicle motion control device, which specifically implements the electronic control technique of Document 1. The device adapts in a hierarchy manner a software configuration for a device that controls a plurality of actuators in an integrated manner to execute motion control of a plurality of different types in a vehicle, whereby the hierarchy structure is optimized from the standpoint of practical usage.

This integrated vehicle motion control device controls a plurality of actuators in an integrated manner through a computer based on information related to driving a vehicle by a driver, to execute a plurality of types of vehicle motion control for the vehicle. At least the software configuration among the hardware configuration and software configuration includes a plurality of elements organized in hierarchy in a direction from the driver towards the plurality of actuators. The plurality of elements include: (a) a control unit determining the target vehicle state quantity based on the driving-related information at the higher level; and (b) an execution unit receiving the determined target vehicle state quantity as an instruction from the control unit to execute the received instruction via at least one of the plurality of actuators at the lower level. The control unit includes an upper level control unit and a lower level control unit, each issuing an instruction to control the plurality of actuators in an integrated manner. The upper level control unit determines a first target vehicle state quantity based on the driving-related information without taking into account the dynamic behavior of the vehicle, and supplies the determined first target vehicle state quantity to the lower level control unit. The lower level control unit determines the second target vehicle state quantity based on the first target vehicle state quantity received from the upper level control unit, taking into account the dynamic behavior of the vehicle, and supplies the determined second target vehicle state quantity to the execution unit. Each of the upper level control unit, the lower level control unit, and the execution unit causes the computer to execute a plurality of modules independent of each other on the software configuration to realize unique functions thereof.

In accordance with the integrated type vehicle motion control device disclosed in Document 2, at least the software configuration among the hardware configuration and software configuration is organized in a hierarchy structure so as to include: (a) a control unit determining a target vehicle state quantity based on driving-related information at the higher level in the direction from the driver to the plurality of actuators; and (b) an execution unit receiving the determined target vehicle state quantity as an instruction from the control unit to execute the received instruction via at least one of the plurality of actuators at the lower level. In other words, at least the software configuration is organized in hierarchal levels such that the control unit and the execution unit are separated from each other in this vehicle motion control device. Since the control unit and the execution unit are independent of each other from the software configuration perspective, respective stages of development, designing, design modification, debugging and the like can be effected without influencing the other. Respective stages can be carried out concurrently with each other. As a result, the period of the working stage requested for the entire software configuration can be readily shortened.

In the electronic control device for a vehicle disclosed in Document 1, however, details for realizing the control device have not been disclosed. Further, although the integrated type vehicle motion control device disclosed in Document 2 embodies the technique of Document 1, in order to incorporate the device into an actual system, it is necessary to further specifically embody the power train control unit shown in FIG. 23 of Document 2.

DISCLOSURE OF THE INVENTION

In view of the foregoing, an object of the present invention is to provide, in a vehicle integrated control system organized in a hierarchical configuration, a driving system control device that defines parameters to be interfaces between different hierarchical levels of the control structure and has good compatibility with an actual system.

A driving system control device according to the present invention is for use in a vehicle integrated control system organized in a hierarchy configuration such that operation is performed in a direction from an upper control hierarchy including a request of a driver to a lower control hierarchy including an actuator. The actuator operates a driving source and a transmission mechanism of a vehicle. The driving system control device includes: a requested output calculation unit that calculates a requested output for the driving source; a target gear ratio determination unit that calculates a target gear ratio in the transmission mechanism; a transmission control unit that controls the transmission mechanism; and a generated torque calculation unit that calculates driving torque generated in the vehicle.

According to the invention, it is possible to define the configuration necessary for the driving system control device in the vehicle integrated control system organized in hierarchical levels. Specifically, the requested output calculation unit calculates requested torque and a requested rotation number for the driving source, the target gear ratio determination unit calculates a target gear ratio in the transmission mechanism, the transmission control unit calculates a parameter for controlling the transmission mechanism, and the generated torque calculation unit calculates driving torque generated in the vehicle. Specifying the configuration as described above makes it possible to output a control parameter calculated by this driving system control device to an actuator control device in a lower control hierarchy, and output another parameter as availability to an upper control hierarchy. In this case, the driving system control device can use the parameters related to various vehicle speeds and torque calculated by the upper control hierarchy, to calculate requested torque and requested rotation number, or to determine a target gear ratio and calculate torque allotted to clutch from target output shaft torque and gearshift time of the automatic transmission, and thus to output control parameters to the engine control device and to the automatic transmission control device. As a result, it is possible to provide, in a vehicle integrated control system organized in hierarchy, a driving system control device that can define the parameters as the interfaces between different levels of the hierarchical control structure and has good compatibility with an actual system.

Preferably, the driving system control device further includes an availability calculation unit that calculates availability of the torque generated in the driving source and outputs the availability to the upper control hierarchy.

According to the invention, in the upper control hierarchy, the requested torque and the requested rotation number for the driving source of the vehicle are calculated, and a process of allotting the torque to the driving system and the brake system is conducted. In this case, the availability of the driving torque is output from the driving system control device as the lower control hierarchy, which prevents the situation where the upper control hierarchy outputs to the lower control hierarchy a control parameter requesting the torque that cannot actually be output. It is noted in the case of using availability to perform operation, the upper and lower levels of the control hierarchy, as well as the control blocks, are synchronized in time. This means that a delay time due to the communication interface, for example, is negligible.

Still preferably, the requested output calculation unit includes a transfer efficiency compensation unit that compensates transfer efficiency.

According to the invention, transfer efficiency is compensated when calculating the torque and the rotation number requested to the engine and/or the driving motor as the driving source of the vehicle, which improves the accuracy in calculation of the requested torque and the requested rotation number.

Still preferably, the generated torque calculation unit compensates transfer efficiency.

According to the invention, transfer efficiency of the driving system control device is compensated when calculating the torque generated in the driving source of the vehicle, so that the accuracy in calculation of the generated torque improves.

Still preferably, the transmission mechanism includes a torque converter, and the requested output calculation unit uses a torque converter inverse model to perform inverse operation of the torque to be generated by the driving source from the requested driving torque.

According to the invention, the torque converter inverse model can be used to perform inverse operation of the driving torque from the requested driving force. Accordingly, in practice, the control parameter for the driving source can be calculated from the requested driving torque.

Still preferably, the transmission mechanism includes a torque converter, and the requested output calculation unit uses a torque converter inverse model to perform inverse operation of the number of rotations to be generated in the driving source from a torque converter output rotation number that is calculated from a vehicle speed or from a driving system output rotation number.

According to the invention, it is possible to use the torque converter inverse model to perform inverse operation of the number of rotations to be generated in the driving source from the torque converter output shaft rotation number. Accordingly, in practice, the control parameter for the driving source can be calculated from the vehicle speed or the driving system output rotation number.

Still preferably, the torque converter inverse model compensates response with respect to a motive power transfer system that is represented by first-order lag and dead time.

According to the invention, the response can be compensated, with the transfer function of the motive power transfer system in the torque converter inverse model being represented with first-order lag and dead time. It is therefore possible to calculate the requested torque and the requested rotation number with a high degree of accuracy.

Still preferably, the requested output calculation unit calculates the requested torque taking into consideration an influence of disturbance due to an auxiliary device of the vehicle as the load of the driving source.

According to the invention, the requested torque can be calculated in response to the operating state of the auxiliary device (e.g., operating request of the compressor of the air conditioner, or charge request of the secondary battery in a hybrid vehicle) as the load of the driving source (e.g., the engine). This improves the accuracy in calculation of the torque requested to the driving source.

Still preferably, the generated torque calculation unit calculates the generated torque taking into consideration the influence of disturbance due to an auxiliary device of the vehicle as the load of the driving source.

According to the invention, the generated torque can be calculated in response to the operating state of the auxiliary device as the load of the driving source. This improves the accuracy in calculation of the requested torque to the driving source.

Still preferably, the requested output calculation unit calculates information for controlling at least two manipulation amounts, differing in response from each other, to control the driving source.

According to the invention, for example in the case where the driving source is an engine, ignition timing of the ignition system quick in response can be controlled with a control parameter of instantaneous value, and throttle of the air system slow in response can be controlled with a control parameter of steady value.

Still preferably, the driving source is at least one of an engine and a driving motor.

According to the invention, it is possible to provide a driving system control device in a vehicle integrated control system that has an engine alone, or a driving motor alone, or both the engine and the driving motor as its driving source(s).

BEST MODES FOR CARRYING OUT THE INVENTION

Figure 1:
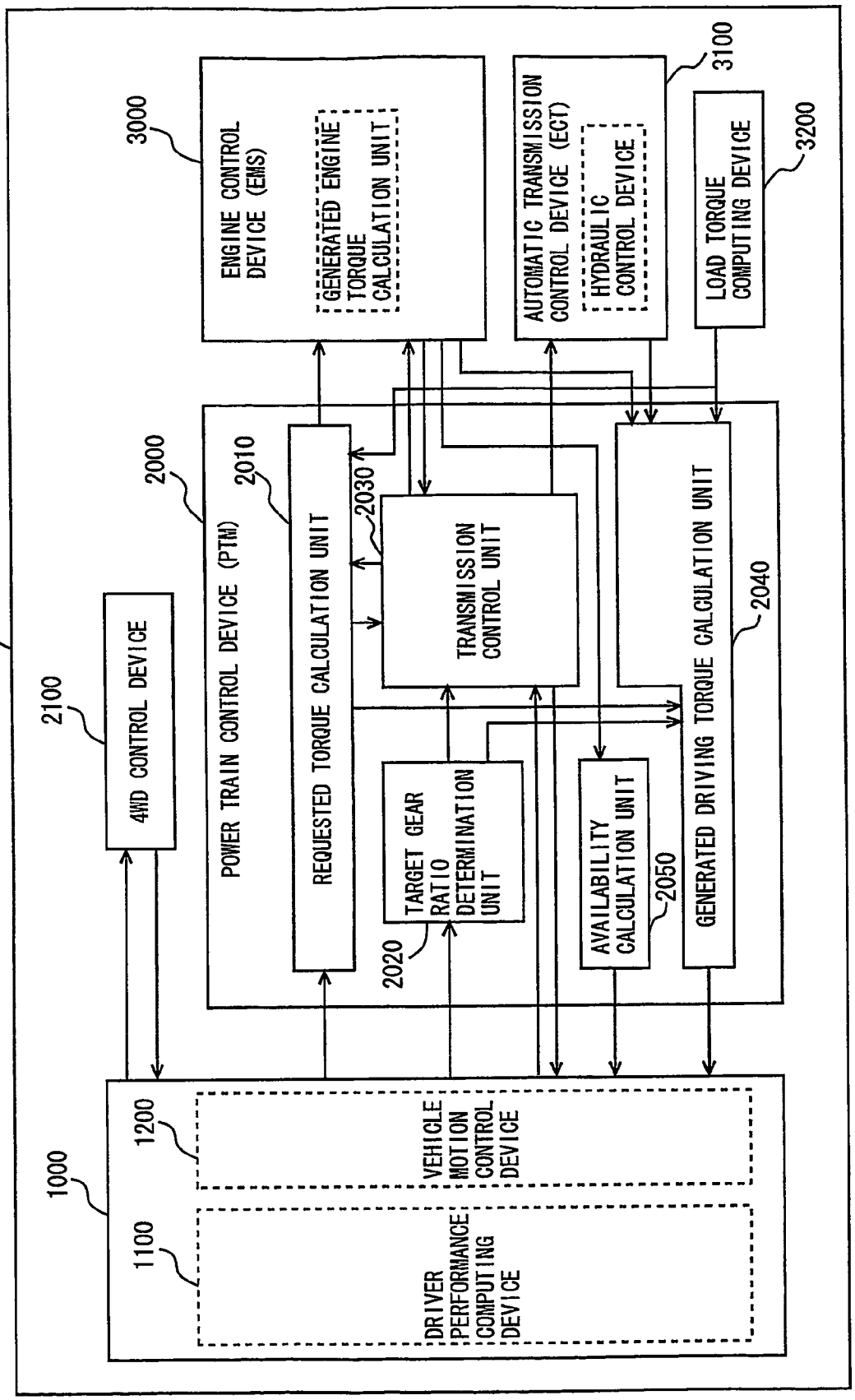
FIG. 1 is a general block diagram of a vehicle integrated control system according to an embodiment of the present invention.

An embodiment of the present invention will be described hereinafter with reference to the drawings. The same elements have the same reference characters allotted. Their names and functions are also identical. Therefore, detailed description thereof will not be repeated.

In the following, description of the contents common to those of Document 2 filed by the same applicant as the present application will not be repeated where appropriate. Although a driving source of a vehicle is an engine in the following description, the present invention is not limited thereto. For example, the present invention is applicable to a hybrid vehicle having a combination of engine and motor as its driving sources, or a fuel cell powered vehicle having a combination of fuel cell stack and motor as its driving sources. It may also be applied to a vehicle mounted with a secondary battery.

Referring to FIG. 1, a whole block of a vehicle integrated control system according to an embodiment of the present invention is explained. A brake system, a steering system, a suspension system and others are not shown in the figure.

The vehicle integrated control system 100 includes, in a direction from the higher level to the lower level of control hierarchy, an upper level computing device 1000, a power train control device (PTM: Power Train Management) 2000 and a 4-wheel-drive (4WD) control device 2100, and an engine control device (EMS: Engine Management System) 3000 and an automatic transmission control device ACT: Electronic Control Transmission) 3100.

Engine control device 3000 and automatic transmission control device 3100 belong to the lower control hierarchy. A 4WD vehicle is assumed in the vehicle integrated control system shown in FIG. 1, although the present invention is not restricted thereto.

Referring to FIG. 1, upper level computing device 1000 is comprised of a driver performance computing device 1100 and a vehicle motion control device 1200. Power train control device 2000 is comprised of a requested torque calculation unit 2010, a target gear ratio determination unit 2020, a transmission control unit 2030, a generated driving torque calculation unit 2040, and an availability calculation unit 2050. Engine control device 3000 includes a generated engine torque calculation unit, and automatic transmission control device 3100 includes a hydraulic control device. A load torque computing device 3200 is also provided, which sends parameters to power train control device 2000 and upper level computing device 1000 to make them perform operation taking into account an influence of load of the engine that is calculated by load torque computing device 3200.

As shown in FIG. 1, power train control device 2000 receives parameters from upper level computing device 1000, and outputs results of operation to upper level computing device 1000. Power train control device 2000 also outputs parameters to engine control device 3000 and automatic transmission control device 3100, and receives parameters from engine control device 3000 and automatic transmission control device 3100.

Upper level computing device 1000 determines how the driving system (engine and automatic transmission) and the brake system (brake) bear part of requested torque for the engine necessary in the vehicle.

Parameters representing the requested, longitudinally-distributed driving torque and the requested, laterally-distributed driving torque are output from upper level computing device 1000 to 4WD control device 2100. Parameters representing the longitudinally- and laterally-distributed availabilities and the confirmed, generated driving torque (or distribution ratio) are output from 4WD control device 2100 to upper level computing device 1000.

Upper level computing device 1000 may conduct operation taking also account of load torque information that is input from load torque computing device 3200 to upper level computing device 1000. For example, consideration may be given in driver performance computing device 1100 so as not to output a requested value with which a difference between the driving source and the load torque will exceed a predetermined value.

In power train control device 2000, as will be described later in detail, requested torque to be generated in the engine is calculated based on the parameter input from upper level computing device 1000 to requested torque calculation unit 2010, and a control parameter is output to engine control device 3000. Further, in power train control device 2000, a target gear ratio is determined by target gear ratio determination unit 2020 based on the parameters output from upper level computing device 1000, and a parameter is output to transmission control unit 2030. Control parameters computed by transmission control unit 2030 are output to engine control device 3000 and to automatic transmission control device 3100 for control of the engine and the automatic transmission, respectively.

Parameters are output from engine control device 3000, automatic transmission control device 3100 and load torque computing device 3200 to generated driving torque calculation unit 2040 for calculation of the generated driving torque, and a parameter is output from generated driving torque calculation unit 2040 to upper level computing device 1000.

With a parameter output from engine control device 3000 to availability calculation unit 2050, availability of the driving torque (engine torque) is calculated, and output to upper level computing device 1000. Here, availability refers to upper and lower limits (limiting values) of the torque the power train (engine, transmission) can actually output. Receiving the availability, upper level computing device 1000 can avoid computing the torque that cannot actually be output by the power train.

Figure 2:
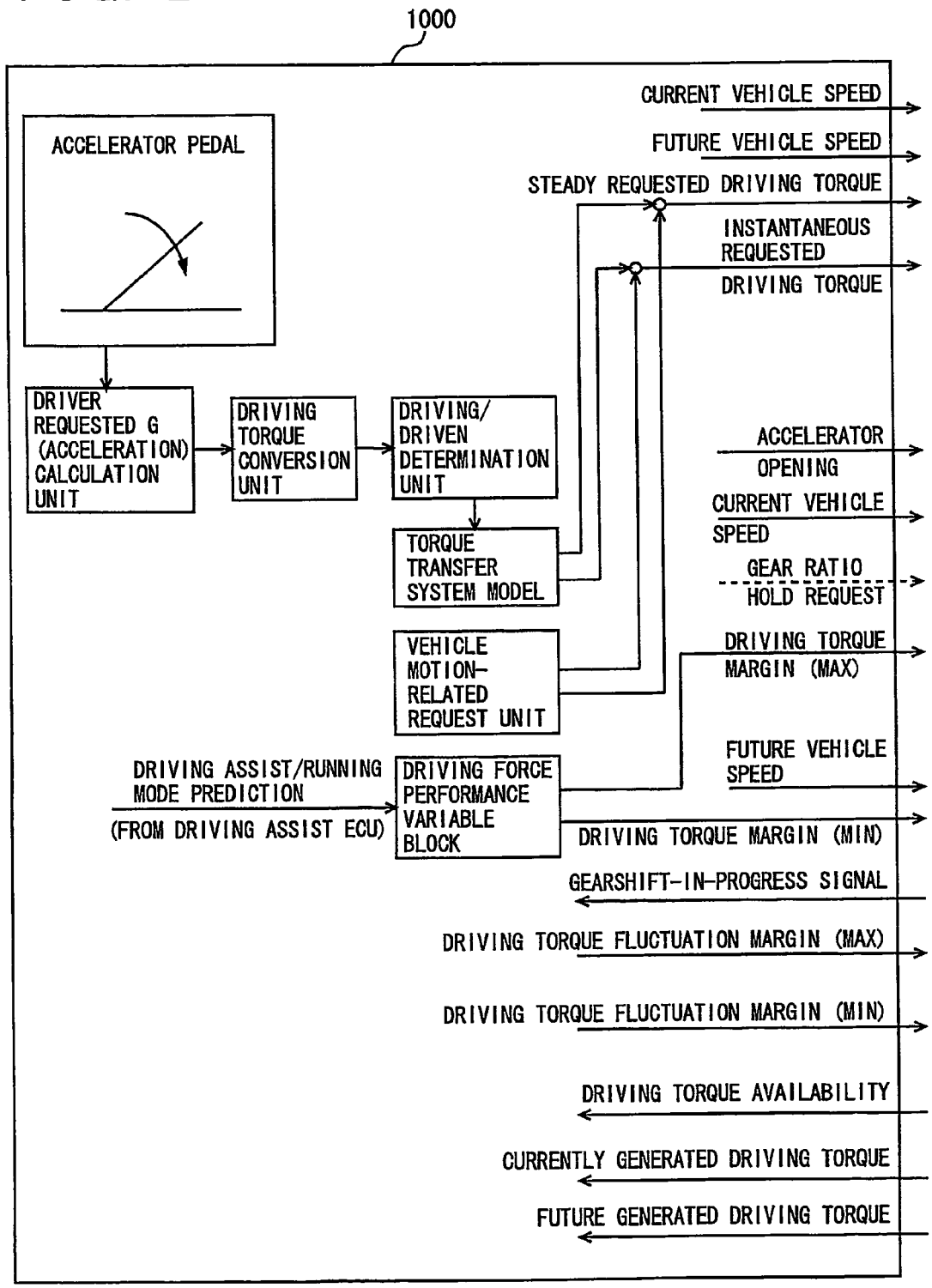
FIG. 2 is a control block diagram of an upper level computing device in FIG. 1.

Referring to FIG. 2, a control block of upper level computing device 1000 of FIG. 1 is described. It is noted that driver performance computing device 1100 and vehicle motion control device 1200 in upper level computing device 1000 are not distinguished from each other in FIG. 2.

As shown in FIG. 2, a driver requested G (acceleration) calculation unit calculates requested acceleration based on a sensor detecting an accelerator pedal opening. A driving torque conversion unit converts the driver requested acceleration to driving torque, and a driving/driven determination unit makes determination of driving or driven. After completion of the determination, parameters for use in calculating steady requested driving torque and instantaneous requested driving torque are calculated based on a torque transfer system model.

The steady requested driving torque and the instantaneous requested driving torque are calculated based on parameters output from a vehicle motion-related request unit and the parameters output from the torque transfer system model. The instantaneous requested driving torque applies to ignition timing control/fuel injection control of an ignition system quick in response in the engine control, and the steady requested driving force corresponds to throttle control of an air system slow in response in the engine control.

A driving assist ECU outputs parameters related to driving assist/running mode prediction to a driving force performance variable block. A predetermined operation is performed in the driving force performance variable block to calculate a driving torque margin (MAX) and a driving torque margin (MIN), which are used to determine a transmission gear ratio.

Further, as shown in FIG. 2, current vehicle speed, future vehicle speed, accelerator opening, gear ratio hold request, driving torque fluctuation margin (MAX), and driving torque fluctuation margin (MIN) are output from upper level computing device 1000 to power train control device 2000 in the lower hierarchical level. A signal indicating that gearshift is in progress, driving torque availability, currently generated driving torque, and driving torque to be generated in the future (or, future generated driving torque) are input from power train control device 2000 to upper level computing device 1000.

Figure 3:
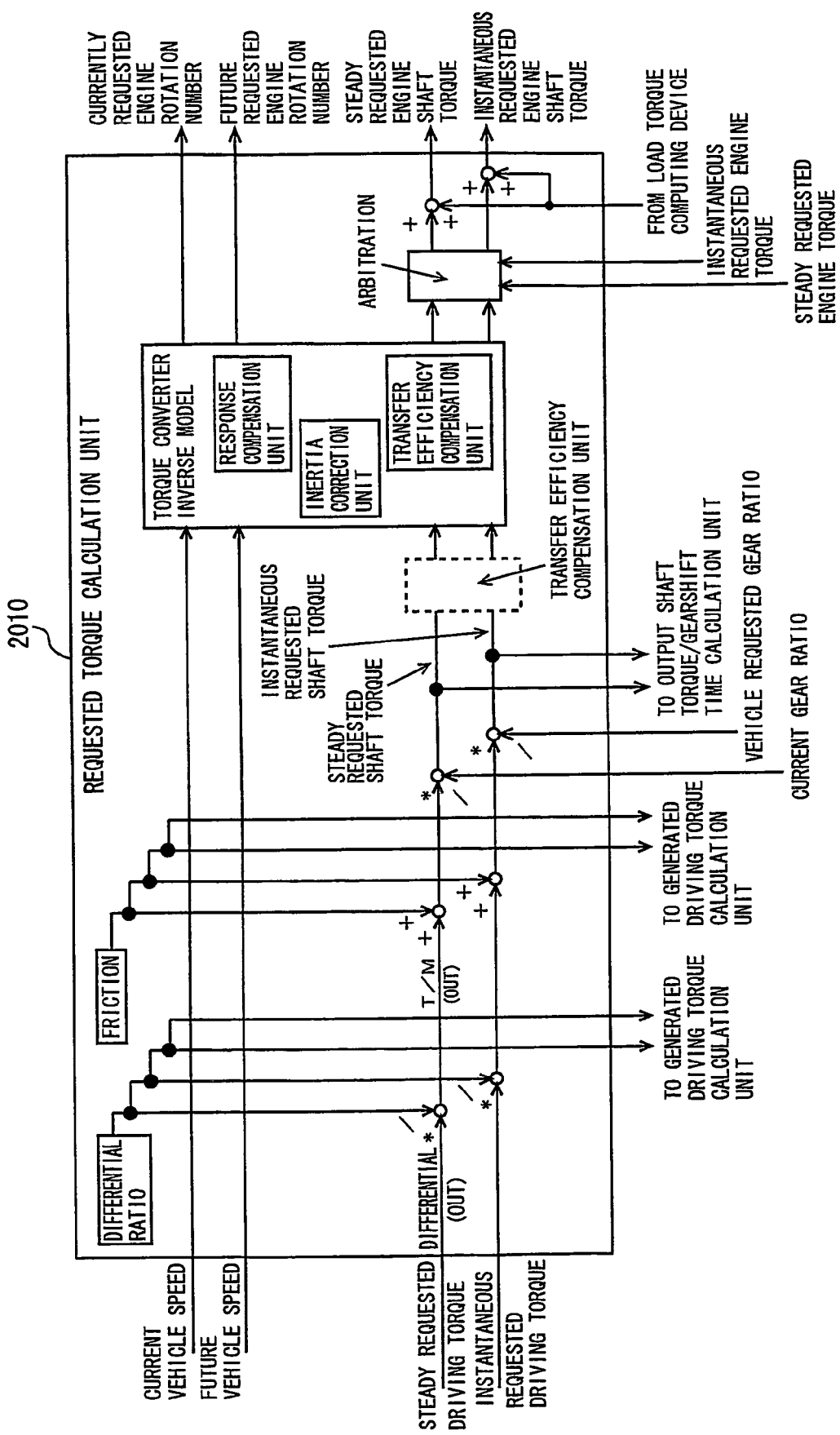
FIG. 3 is a control block diagram of a requested torque calculation unit in FIG. 1.

Referring to FIG. 3, a control block of requested torque calculation unit 2010 of power train control device 2000 is explained.

Required torque calculation unit 2010 receives current vehicle speed, future vehicle speed, steady requested driving torque, and instantaneous requested driving torque from upper level computing device 1000. As shown in FIG. 3, requested torque calculation unit 2010 prestores parameters for differential ratio and friction. The current vehicle speed and the future vehicle speed are input to a transfer efficiency compensation processing unit and to a torque converter inverse model. Here, the transfer efficiency compensation processing refers to compensation of the transfer efficiency by multiplying a constant (here, the constant <1) that is represented by the transmission gear ratio, the oil temperature of the automatic transmission, and the vehicle speed.

As for the steady requested driving torque, the output torque of the differential gear is divided by the differential ratio to calculate an output shaft torque of the automatic transmission, which is added with the friction and then divided by the current gear ratio, to thereby calculate the steady requested shaft torque. This steady requested shaft torque undergoes the above-described transfer efficiency compensation processing, before being input to the torque converter inverse model. Likewise, the instantaneous requested driving torque undergoes operation similar to that of the steady requested driving torque described above. The resultant is subjected to the transfer efficiency compensation processing, and then input to the torque converter inverse model.

Arbitration is made between the steady requested engine torque and the instantaneous requested engine torque output from the torque converter inverse model, and the steady requested engine torque and the instantaneous requested engine torque output from transmission control unit 2030. The arbitrated outputs are each added with the output torque value from load torque computing device 3200, and thus, steady requested engine shaft torque and instantaneous requested engine shaft torque are output.

The differential ratio is output from requested torque calculation unit 2010 to generated driving torque calculation unit 2040, the friction is output from requested torque calculation unit 2010 to generated driving torque calculation unit 2040, and the steady requested shaft torque and the instantaneous requested shaft torque are output from requested torque calculation unit 2010 to an output shaft torque/gearshift time calculation unit.

As shown in FIG. 3, requested torque calculation unit 2010 includes the torque converter inverse model. The parameter calculated based on the current vehicle speed and the parameter calculated based on the future vehicle speed are input to the torque converter inverse model. The parameter calculated based on the steady requested driving torque and the parameter calculated based on the instantaneous requested driving torque, both having undergone the transfer efficiency compensation processing, are also input to the torque converter inverse model.

The torque converter inverse model is comprised of an inertia correction unit, a response compensation unit, and a transfer efficiency compensation unit. In the torque converter inverse model, inverse operation of engine torque from requested driving input shaft torque is carried out. In the response compensation of the torque converter inverse model, the response is compensated with respect to the transfer function that is represented as a first-order lag plus dead time system $\{1/(Ts+1) \times e^{-Ls}\}$. The steady requested engine shaft torque and the instantaneous requested engine shaft torque calculated via the torque converter inverse model are output to engine control device 3000.

Figure 4:
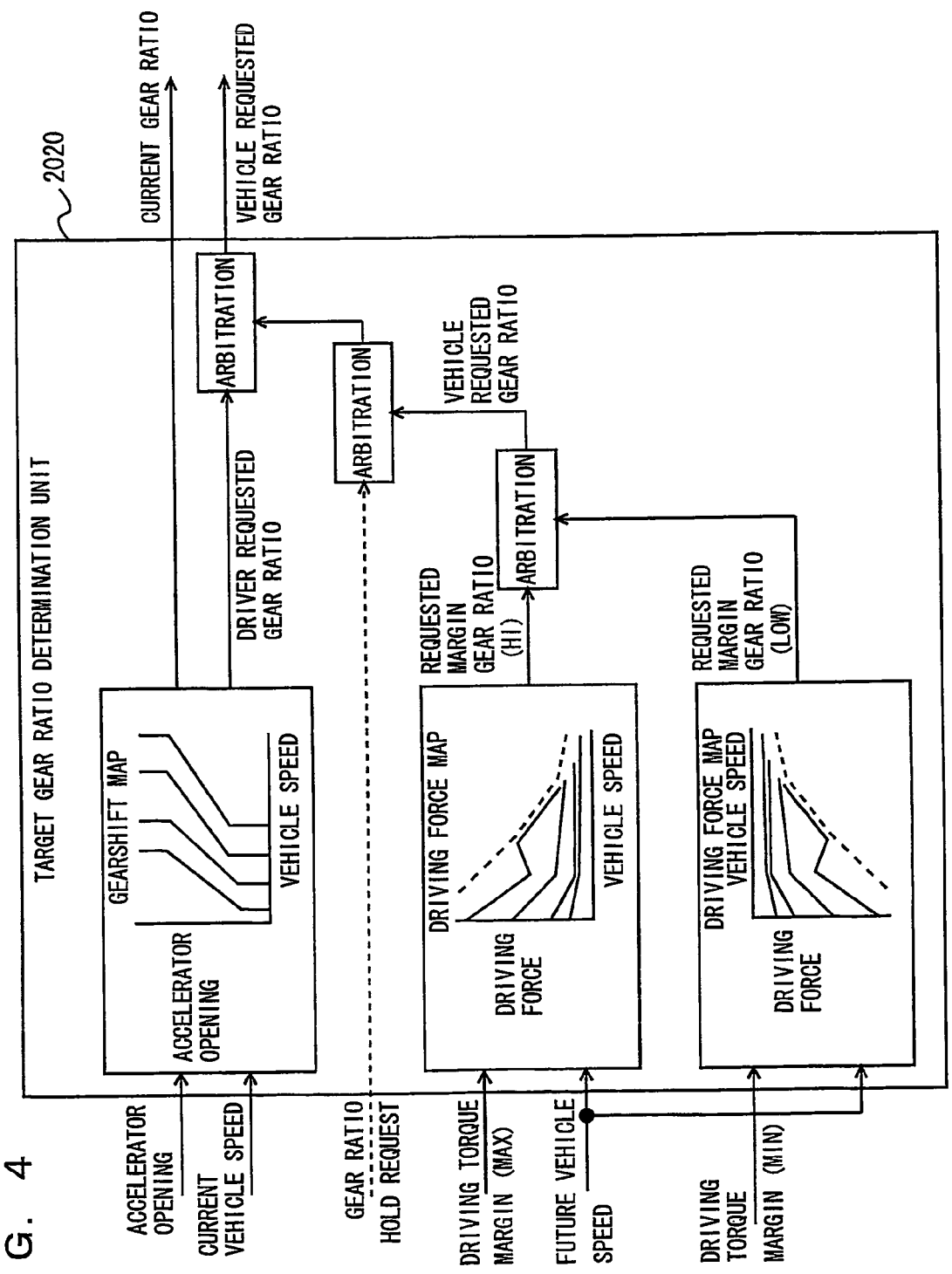
FIG. 4 is a control block diagram of a target gear ratio determination unit in FIG. 1.

Referring to FIG. 4, a control block of target gear ratio determination unit 2020 in power train control device 2000 is explained.

As shown in FIG. 4, target gear ratio determination unit 2020 receives the accelerator opening and the current vehicle speed from upper level computing device 1000, and calculates a current gear ratio and a driver requested gear ratio based on the received accelerator opening and current vehicle-speed as well as on a gearshift map.

Further, target gear ratio determination unit 2020 calculates a requested margin gear ratio (HI) based on the driving torque margin (MAX) and the future vehicle speed input from upper level computing device 1000 as well as on a driving force map, and also calculates a requested margin gear ratio (LOW) based on the future vehicle speed and driving torque margin (MIN) input from upper level computing device 1000 as well as on another driving force map (driven side).

Arbitration is made between the requested margin gear ratio (HI) and the requested margin gear ratio (LOW) based on whether it is on the driving side or the driven side, and a vehicle requested gear ratio is calculated. At this time, if a gear ratio hold request has been input from upper level computing device 1000 to power train control device 2000, the vehicle requested gear ratio is arbitrated in accordance with the gear ratio hold request.

The vehicle requested gear ratio thus having undergone arbitration is further arbitrated by the driver requested gear ratio. As shown in FIG. 4, target gear ratio determination unit 2020 outputs the current gear ratio and the vehicle requested gear ratio to transmission control unit 2030.

Figure 5:
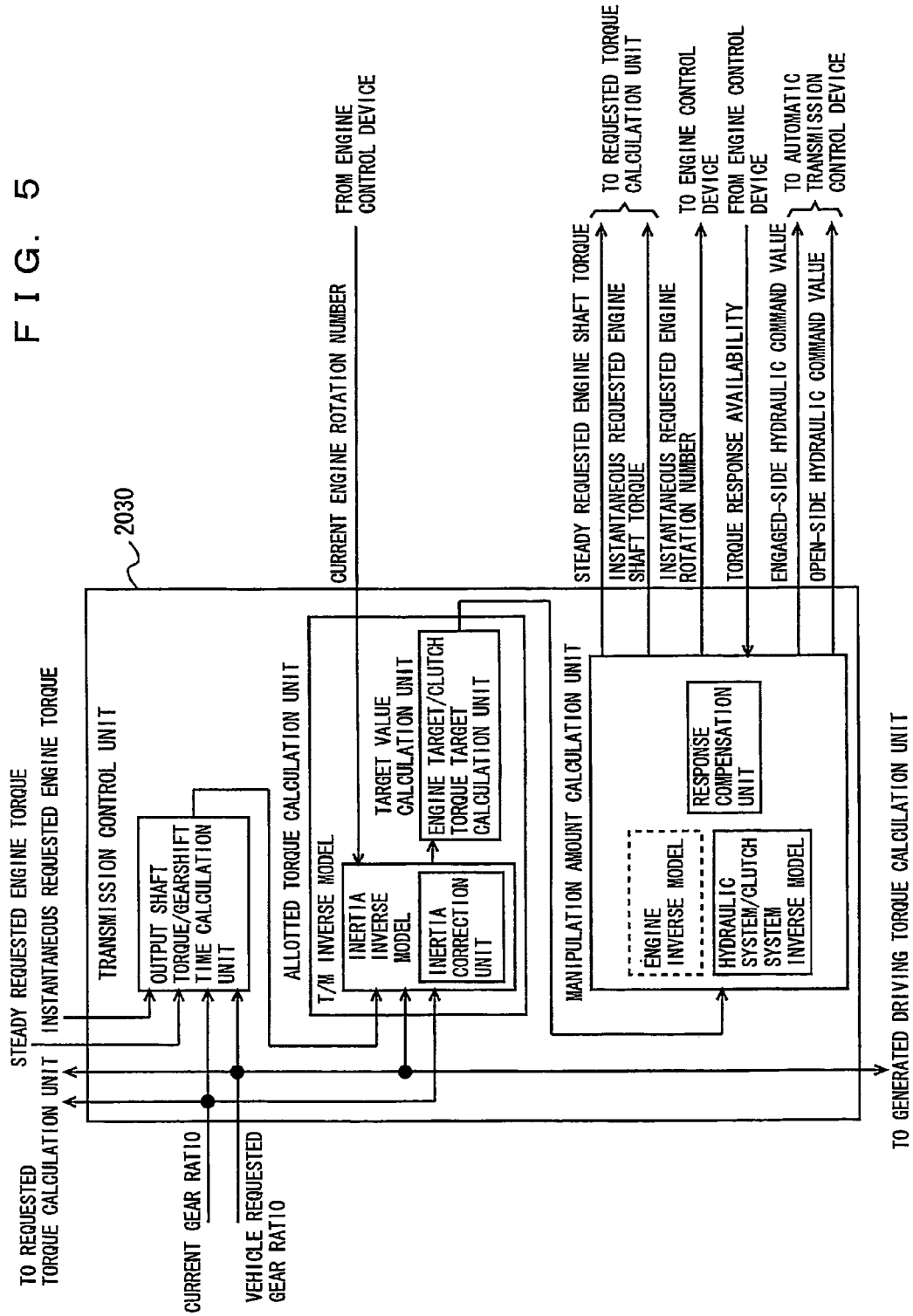
FIG. 5 is a control block diagram of a transmission control unit in FIG. 1.

Referring to FIG. 5, a control block of transmission control unit 2030 of power train control device 2000 is explained.

As shown in FIG. 5, the current gear ratio and the vehicle requested gear ratio input from target gear ratio determination unit 2020 to transmission control unit 2030, as well as the steady requested shaft torque and the instantaneous requested shaft torque input from requested torque calculation unit 2010, are input to the output shaft torque/gearshift time calculation unit. The output shaft torque/gearshift time calculation unit calculates a target value of the output shaft of the automatic transmission. At this time, the waveform and the gearshift time of the output shaft torque are calculated.

The waveform and the gearshift time of the output shaft torque, as the target values of the transmission output shaft, are input to a transmission inverse model in an allotted torque calculation unit. The current gear ratio and the vehicle requested gear ratio sent from target gear ratio determination unit 2020 are also input, and an inertia inverse model is used to output a steady requested engine rotation number to engine control device 3000.

A target value of the engine torque and a target value of the clutch torque are calculated based on the parameters output from the transmission inverse model to an engine target/clutch torque target calculation unit. The engine torque target value and the clutch torque target value calculated are input to a manipulation amount calculation unit, where prescribed operation is carried out by an engine inverse model, a hydraulic system clutch system inverse model and a response compensation unit, and steady requested engine shaft torque and instantaneous requested engine shaft torque are output to requested torque calculation unit 2010.

The manipulation amount calculation unit outputs an engaged-side hydraulic command value and an open-side hydraulic command value to automatic transmission control device 3100, and receives torque response availability from engine control device 3000. The manipulation amount calculation unit performs a prescribed operation based on the torque availability, strictly within the range defined by the torque availability.

Figure 6:
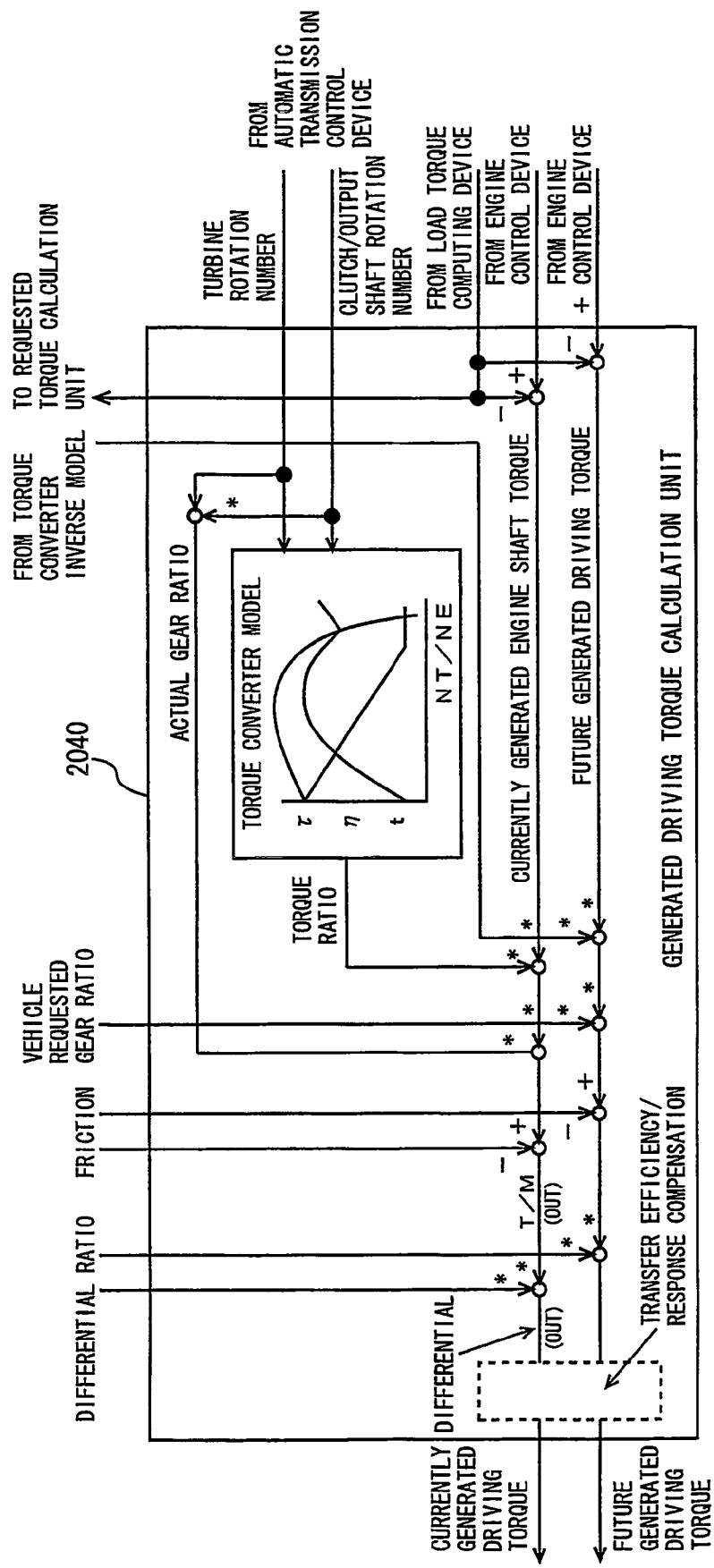
FIG. 6 is a control block diagram of a generated driving torque calculation unit in FIG. 1.

Referring to FIG. 6, a control block of generated driving torque calculation unit 2040 of power train control device 2000 is explained.

As shown in FIG. 6, generated driving torque calculation unit 2040 receives load torque from load torque computing device 3200 that includes thermal manager conducting exhaust heat control of an air conditioner or the like as the load and energy management conducting charge/discharge control of a secondary battery as the load. The load torque is input to requested torque calculation unit 2010 as well.

The turbine rotation number as well as the clutch/output shaft rotation number are input from automatic transmission control device 3100 to generated driving torque calculation unit 2040, and a torque converter model is used to calculate a torque ratio. The currently generated engine shaft torque and the future generated engine shaft torque are input from engine control device 3000 to generated driving torque calculation unit 2040, and a difference operation with the load torque is conducted to carry out load torque compensation processing.

The currently generated engine shaft torque is multiplied by the torque ratio, and the future generated driving torque is multiplied by a parameter from the torque converter inverse model. The resultant values are each multiplied by the vehicle requested gear ratio, from which the friction is subtracted, and then multiplied by the differential ratio, followed by transfer efficiency/response correction. As such, the currently generated driving torque and the future generated driving torque are calculated and output to upper level computing device 1000.

As described above, according to the driving system control device of the vehicle integrated control system of the present embodiment, the power train control device can use the parameters related to vehicle speeds and torque calculated by the upper level computing device, to calculate requested torque, or to determine a target gear ratio and calculate output shaft torque and gearshift time of the automatic transmission to thereby calculate allotted torque, and can output control parameters to the engine control device and to the automatic transmission control device.

Further, the generated driving torque calculation unit, while taking into account the influence of the engine auxiliary device as the load of the engine, calculates the generated driving torque from the engine shaft torque generated in the engine, and performs transfer efficiency/response correction on the calculated torque before being output to the upper level computing device. This improves the accuracy in operation in the device of the upper hierarchical level when calculating requested torque based on the torque availability, the currently generated driving torque and the future generated driving torque.

Still further, the requested torque calculation unit and the generated driving torque calculation unit are each provided with the transfer efficiency compensation unit, which also improves the accuracy in operation. In the requested torque calculation unit, the torque converter inverse model is used to perform inverse operation of the engine torque from the requested driving torque and inverse operation of the requested engine rotation number from the (current, future) vehicle speeds. Accordingly, the engine control parameters can actually be calculated from the requested torque and the requested rotation number.

As a result, it is possible to provide, in the vehicle integrated control system organized in a hierarchical configuration, a driving system control device that can define parameters as the interfaces between the different levels of the hierarchical control structure and has good compatibility with an actual system.

It is noted that the gearshift map shown in FIG. 4 may be incorporated into the driving torque conversion unit shown in FIG. 2. More specifically, the driving force conversion unit shown in FIG. 2 may be provided with a three-dimensional map with the transmission gear ratio as an additional parameter. Further, transmission control unit 2030 may be configured as part of automatic transmission control device 3100.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A driving system control device in a vehicle integrated control system organized in a hierarchical configuration such that operation is performed in a direction from an upper control hierarchy including a request of a driver to a lower control hierarchy including an actuator, said actuator operating a driving source and a transmission mechanism of the vehicle,
    said driving system control device comprising:
    a requested output calculation unit calculating a requested output for said driving source based on a parameter from the upper control hierarchy;
    a target gear ratio determination unit calculating a target gear ratio in said transmission mechanism based on a parameter from the upper control hierarchy;
    a transmission control unit controlling said transmission mechanism;
    a generated torque calculation unit calculating driving torque generated in said vehicle; and
    an availability calculation unit calculating availability of torque generated in the driving source and outputting the availability to the upper control hierarchy, based on a parameter from the lower control hierarchy.

2. The driving system control device according to claim 1, wherein said requested output calculation unit includes a transfer efficiency compensation unit compensating transfer efficiency.

3. The driving system control device according to claim 1, wherein said generated torque calculation unit includes a transfer efficiency compensation unit compensating transfer efficiency.

4. The driving system control device according to claim 1, wherein
    said transmission mechanism includes a torque converter, and
    said requested output calculation unit performs inverse operation of torque to be generated in said driving source from the requested driving torque, using a torque converter inverse model.

5. The driving system control device according to claim 4, wherein said torque converter inverse model compensates response with respect to a motive power transfer system that is represented by a first-order lag and dead time.

6. The driving system control device according to claim 1, wherein
    said transmission mechanism includes a torque converter, and
    said requested output calculation unit uses a torque converter inverse model to perform inverse operation of the number of rotations to be caused in said driving source from a torque converter output rotation number that is calculated from a vehicle speed or a driving system output rotation number.

7. The driving system control device according to claim 6, wherein said torque converter inverse model compensates response with respect to a motive power transfer system that is represented by first-order lag and dead time.

8. The driving system control device according to claim 1, wherein said requested output calculation unit calculates the requested output taking account of an influence of disturbance due to an auxiliary device of the vehicle that is a load of said driving source.

9. The driving system control device according to claim 1, wherein said generated torque calculation unit calculates generated torque taking account of an influence of disturbance due to an auxiliary device of the vehicle that is a load of said driving source.

10. The driving system control device according to claim 1, wherein said requested output calculation unit calculates information for controlling at least two manipulation amounts, differing in response, to control said driving source.

11. The driving system control device according to claim 1, wherein said driving source is at least one of an engine and a driving motor.

12. A driving system control device in a vehicle integrated control system organized in a hierarchical configuration such that operation is performed in a direction from an upper control hierarchy including a request of a driver to a lower control hierarchy including an actuator, said actuator operating a driving source and a transmission mechanism of the vehicle,
    said driving system control device comprising:
    requested output calculation means for calculating a requested output for said driving source based on a parameter from the upper control hierarchy;
    target gear ratio determination means for calculating a target gear ratio in said transmission mechanism based on a parameter from the upper control hierarchy;
    transmission control means for controlling said transmission mechanism;
    generated torque calculation means for calculating driving torque generated in said vehicle; and
    an availability calculation means for calculating availability of torque generated in the driving source and outputting the availability to the upper control hierarchy, based on a parameter from the lower control hierarchy.

13. The driving system control device according to claim 12, wherein said requested output calculation means includes a transfer efficiency compensation means for compensating transfer efficiency.

14. The driving system control device according to claim 12, wherein said generated torque calculation means includes a transfer efficiency compensation means for compensating transfer efficiency.

15. The driving system control device according to claim 12, wherein
said transmission mechanism includes a torque converter, and
said requested output calculation means includes means for performing inverse operation of torque to be generated in said driving source from the requested driving torque, using a torque converter inverse model.

16. The driving system control device according to claim 15, wherein said torque converter inverse model includes means for compensating response with respect to a motive power transfer system that is represented by a first-order lag and dead time.

17. The driving system control device according to claim 12, wherein
said transmission mechanism includes a torque converter, and
said requested output calculation means includes means for performing inverse operation of the number of rotations to be caused in said driving source from a torque converter output rotation number that is calculated from a vehicle speed or a driving system output rotation number, using a torque converter inverse model.

18. The driving system control device according to claim 17, wherein said torque converter inverse model includes means for compensating response with respect to a motive power transfer system that is represented by first-order lag and dead time.

19. The driving system control device according to claim 12, wherein said requested output calculation means includes means for calculating the requested output taking account of an influence of disturbance due to an auxiliary device of the vehicle that is a load of said driving source.

20. The driving system control device according to claim 12, wherein said generated torque calculation means includes means for calculating generated torque taking account of an influence of disturbance due to an auxiliary device of the vehicle that is a load of said driving source.

21. The driving system control device according to claim 12, wherein said requested output calculation means includes means for calculating information for controlling at least two manipulation amounts, differing in response, to control said driving source.

22. The driving system control device according to claim 12, wherein said driving source is at least one of an engine and a driving motor.

23. The driving system control device according to claim 1, wherein the generated torque calculation unit calculates a currently generated driving torque and a future generated driving torque based on an output of the lower control hierarchy, and outputs the currently generated driving torque and the future generated driving torque to the upper control hierarchy.

24. The driving system control device according to claim 12, wherein the generated torque calculation means includes means for calculating a currently generated driving torque and a future generated driving torque based on an output of the lower control hierarchy, and outputs the currently generated driving torque and the future generated driving torque to the upper control hierarchy.

* * * * *